(12) United States Patent
Linortner

(10) Patent No.: US 8,613,420 B2
(45) Date of Patent: Dec. 24, 2013

(54) SOLENOID VALVE

(75) Inventor: Thomas Linortner, Graz (AT)

(73) Assignee: Magna Powertrain AG & Co. KG, Lannach (AT)

( * ) Notice: Subject to any disclaimer, the term of this patent is extended or adjusted under 35 U.S.C. 154(b) by 257 days.

(21) Appl. No.: 12/820,207

(22) Filed: Jun. 22, 2010

(65) Prior Publication Data
US 2010/0327199 A1    Dec. 30, 2010

(30) Foreign Application Priority Data

Jun. 26, 2009  (DE) .......................... 10 2009 030 692

(51) Int. Cl.
*F16K 31/02* (2006.01)
(52) U.S. Cl.
USPC ............ 251/129.15; 251/129.07; 251/129.18; 251/355; 137/315.03
(58) Field of Classification Search
USPC .................. 251/129.15, 129.07, 129.18, 355; 137/315.03
See application file for complete search history.

(56) References Cited

U.S. PATENT DOCUMENTS

| | | | | |
|---|---|---|---|---|
| 5,605,386 | A * | 2/1997 | Ziegler et al. ............... | 303/119.2 |
| 5,722,633 | A * | 3/1998 | Goossens et al. ......... | 251/129.15 |
| 5,791,628 | A * | 8/1998 | Wolff et al. ..................... | 251/52 |
| 5,845,672 | A * | 12/1998 | Reuter et al. ............. | 137/315.03 |
| 7,011,596 | B2 * | 3/2006 | Haka ............................ | 475/285 |
| 7,243,899 | B2 * | 7/2007 | Acar et al. ............... | 251/129.07 |
| 7,871,056 | B2 * | 1/2011 | Kratzer ..................... | 251/129.02 |
| 8,096,485 | B2 * | 1/2012 | Hlousek et al. ................. | 239/13 |
| 2003/0080305 | A1 * | 5/2003 | Schafer ..................... | 251/129.07 |
| 2004/0180752 | A1 | 9/2004 | Haka | |
| 2004/0251441 | A1 * | 12/2004 | Schmitt et al. ........... | 251/129.07 |
| 2006/0081803 | A1 * | 4/2006 | Kawa et al. ............... | 251/129.15 |
| 2007/0164245 | A1 * | 7/2007 | Kratzer ..................... | 251/129.15 |
| 2009/0008587 | A1 * | 1/2009 | Speer et al. .............. | 251/129.15 |
| 2010/0187459 | A1 * | 7/2010 | Kratzer ..................... | 251/129.15 |
| 2012/0067689 | A1 * | 3/2012 | Eastman ....................... | 192/69.4 |

FOREIGN PATENT DOCUMENTS

| | | | | |
|---|---|---|---|---|
| CN | 1760575 | A | 4/2006 | |
| CN | 101421506 | A | 4/2009 | |
| DE | 103 37 206 | | 3/2005 | |
| JP | 03092686 | A * | 4/1991 | ............. F16K 31/06 |

* cited by examiner

*Primary Examiner* — John K Fristoe, Jr.
*Assistant Examiner* — Minh Le
(74) *Attorney, Agent, or Firm* — Dickinson Wright PLLC

(57) ABSTRACT

A solenoid valve for controlling a hydraulic system having a coil which is composed of an electrical conductor, an armature which is situated at least partially inside the coil and is connected to a valve element for opening and closing a flow opening of the solenoid valve, and a hydraulic fluid-filled valve chamber that accommodates the armature and communicates fluidically with the hydraulic system. The armature is supported in movable fashion in the hydraulic fluid of the hydraulic system. In order to reduce the viscosity of the hydraulic fluid, the coil is situated so that a heating of the coil produced by a current flow produces a heating of the hydraulic fluid in the valve chamber.

17 Claims, 3 Drawing Sheets

SOLENOID VALVE

FIELD

The present invention relates to a solenoid valve for controlling a hydraulic system, having a coil, which is comprised of an electrical conductor, and having an armature, which is situated at least partially inside the coil and is connected to a valve element for opening and closing a flow opening of the solenoid valve.

BACKGROUND

In many cases, solenoid valves are an essential component of hydraulic systems. When current is supplied to the electrical conductor, this produces a magnetic field that acts on the armature, exerting a force on it and causing it to move. Because the armature and valve element are connected, the valve element also moves in corresponding fashion, making it possible to control a flow of hydraulic fluid through the flow opening. In many applications, the reaction time, i.e. the time that elapses between an activation signal and a reaction of the hydraulic system, is of critical importance. For example, in automotive engineering, clutches are often actuated by hydraulic systems. The handling of a vehicle depends on the actuation dynamics of the clutch and therefore on the reaction speed of the hydraulic system actuating the clutch. The ability to permissibly influence the handling of the vehicle even in critical situations requires quickly and precisely reacting solenoid valves of the type described at the outset.

A particular class of solenoid valves has a hydraulic fluid-filled valve chamber that accommodates the armature and communicates fluidically with the hydraulic system so that the armature is supported in movable fashion in the hydraulic fluid of the hydraulic system. In this type of solenoid valves with an armature "floating" in hydraulic fluid, the armature displaces the hydraulic fluid in the valve chamber with each switching action. In other words, the armature moves in the fluid, causing a flowing motion of the hydraulic fluid. The flow resistance of the hydraulic fluid acting in opposition to the armature depends, among other things, on its viscosity. With a high viscosity of the hydraulic fluid, the movement of the armature when the solenoid valve is activated is slowed more forcefully than with a low viscosity of the hydraulic fluid. A high viscosity of the hydraulic fluid therefore has a negative impact on the switching dynamics of the solenoid valve and thus on the switching dynamics of the whole hydraulic system. Situations of this kind arise particularly when the hydraulic fluid is cold, for example when a motor vehicle is started.

SUMMARY

One object of the invention, therefore, is to create a solenoid valve that always functions reliably and has high switching dynamics in all operating states. The solenoid valve should also be inexpensive to manufacture.

This object is attained by means of a solenoid valve having a coil that is situated so that a heating of the coil produced by a current flow heats the hydraulic fluid in the valve chamber in order to reduce the viscosity of the hydraulic fluid.

In other words, the coil provided to actuate the armature is simultaneously used to heat the hydraulic fluid in order to keep its viscosity low and thus continuously assure high actuation dynamics of the solenoid valve. The heating is produced by the ohmic resistance of the coil. The heat generated is transmitted to the hydraulic fluid contained in the valve chamber through a suitable spatial placement of the coil. In particular, the coil is situated in spatial proximity to the valve chamber in order to improve the transmission of heat from the coil to the hydraulic fluid contained in the valve chamber.

According to one embodiment of the solenoid valve in accordance with the invention, a side wall of the valve chamber oriented toward the coil and an end wall of the valve chamber constitute a fluid-tight housing that is in particular embodied of one piece. Consequently, the valve chamber is essentially "closed at one end." For example, the valve chamber is only open at the end oriented toward the valve element and therefore toward the flow opening. A flow of hydraulic fluid through the valve chamber does not occur in this embodiment; a "flow through" is understood to be an entry of the hydraulic fluid at one end of the valve chamber and an exit of the hydraulic fluid at the other end of the valve chamber.

In particular, the flow opening is situated at the end of the valve chamber oriented away from the end wall.

For example, the housing can be composed of a cup-shaped sleeve that is inexpensive to manufacture.

In order to facilitate the flow of hydraulic fluid between the armature and the side walls of the valve chamber, recesses can be provided in the armature. In addition or alternatively, recesses can also be provided in the valve element in order to facilitate the flow of hydraulic fluid between the valve element and the side walls of the valve chamber and/or between the valve element and a valve element seat supporting the valve element. Recesses of this kind make it easier for the hydraulic fluid to "flow past" the above-mentioned components, ultimately reducing the flow resistance of the hydraulic fluid that has to be overcome. This improves the switching dynamics of the solenoid valve. The larger the recesses are, though, the greater the selected voltage must be in order to actuate the solenoid valve.

According to another embodiment of the solenoid valve, it is situated in or on a transfer case or an all-wheel clutch of a vehicle. Transfer cases and all-wheel clutches can significantly affect the driving dynamics of a vehicle so that actuating them in a precise and above all, rapid fashion is of critical importance, particularly with regard to the compatibility with drive dynamics control systems (ABS/ESP).

It is also possible for the solenoid valve to be associated with a control unit that is embodied to control the solenoid valve in accordance with one of the embodiments of a control method explained below.

The invention also relates to a method for controlling a solenoid valve for a hydraulic system in which the solenoid valve includes a coil, which is comprised of an electrical conductor, and includes an armature, which is situated at least partially inside the coil and is supported in moving fashion in a hydraulic fluid of the hydraulic system. The solenoid valve can be activated by supplying current to the coil.

The control of solenoid valves of this kind involves the above-described problem that the actuation dynamics of the solenoid valve are critically dependent on the viscosity of the hydraulic fluid.

Another object of the invention, therefore, is to create a method for controlling a solenoid valve of the above-mentioned type that permits a reliable, precise control. Primarily, the method should always assure high actuation dynamics of the solenoid valve.

According to a first variant of the, the coil is also supplied with current in operating states in which the solenoid valve does not have to be activated to control the hydraulic system; this is done in order to heat the hydraulic fluid at least locally in order to reduce its viscosity.

In other words, even in states in which the solenoid valve would not be supplied with current in order to save energy, such a supply of current should be deliberately carried out in order to heat the hydraulic fluid at least in the region surrounding the armature so as to reduce its viscosity. As mentioned several times above, this results in an increase in the actuation dynamics of the solenoid valve.

According to the second variant of the method for controlling the solenoid valve, in operating states in which the solenoid valve is activated, the coil is at least sometimes acted on with a working current supply that is greater than a minimum current supply to the solenoid valve required to overcome or compensate for the hydraulic pressure of the hydraulic fluid; this is done in order to heat the hydraulic fluid at least locally in order to reduce its viscosity.

The solenoid valve is therefore activated not solely with the current supply required to open or close a flow aperture of the solenoid valve in opposition to the pressure prevailing in the hydraulic system. By contrast, a higher current supply (working current supply) is deliberately provided at least sometimes in order to produce additional heat that reduces the viscosity of the hydraulic fluid or keeps its viscosity low.

Both methods can be easily incorporated into known methods for controlling a solenoid valve and, independently of each other, achieve an improvement in the actuation dynamics of the solenoid valve. In other words, the surprisingly simple but nevertheless efficient control methods according to the invention can achieve a significant improvement in the performance parameters of a solenoid valve without requiring extensive structural changes to the solenoid valve or design adaptations of the method for controlling it.

The two embodiment variants can also be combined at will if the respective intended use so requires. A "combined" control method can be used to take into account a multitude of hydraulic system states.

According to one embodiment of the method, the activation closes the solenoid valve, i.e., the flow of hydraulic fluid through the flow aperture is interrupted. It is thus possible, for example, to produce a "fail safe" function since in the event of an interruption in the current supply during a malfunction, the valve is automatically opened, thus relieving the hydraulic pressure in the hydraulic system.

In particular, the working current supply is a supply of current to the coil with a predetermined electrical power, for example with a maximum possible current supply from a technical/structural standpoint.

The working current supply can be a function of the minimum current supply. In this case, it is possible for there to be different—linear or nonlinear—relationships between the minimum current supply and the working current supply. Among other things, it is conceivable for there to be a fixed offset value that is added to the minimal current supply. It is also possible, however, to provide a particularly high working current supply specifically in a low minimum current supply range in order to be able to produce a sufficient heating power. In high minimum current supply ranges, i.e. current supplies that are required to overcome a high hydraulic pressure in the hydraulic system, it is possible for the working current supply to be only slightly higher than the minimum current supply.

An additional level of flexibility for the method is achieved in that the working current supply is provided at predetermined times, in particular regularly, and/or when requested by means of an activation signal. For example, it is possible at regular intervals to provide an activation with a working current supply, with the intervals being independent of the current operating state. In this variant, it is necessary to assure that the current supply does not result in any undesirable operating states that have a negative impact on the control of the hydraulic system, i.e. they do not for example cause undesired actuation of a clutch. In order to circumvent this problem, the above-mentioned type of current supply can also be carried out on request. The request can be triggered by a signal from a sensor. It is possible for the control unit to only issue the request after a permissibility test in order to avoid undesirable driving states.

Other embodiments of the invention are disclosed in the description, the drawings and the dependent claims.

DRAWINGS

The invention is described below solely by way of example, with reference to advantageous embodiments.

DETAILED DESCRIPTION

Figure 1:
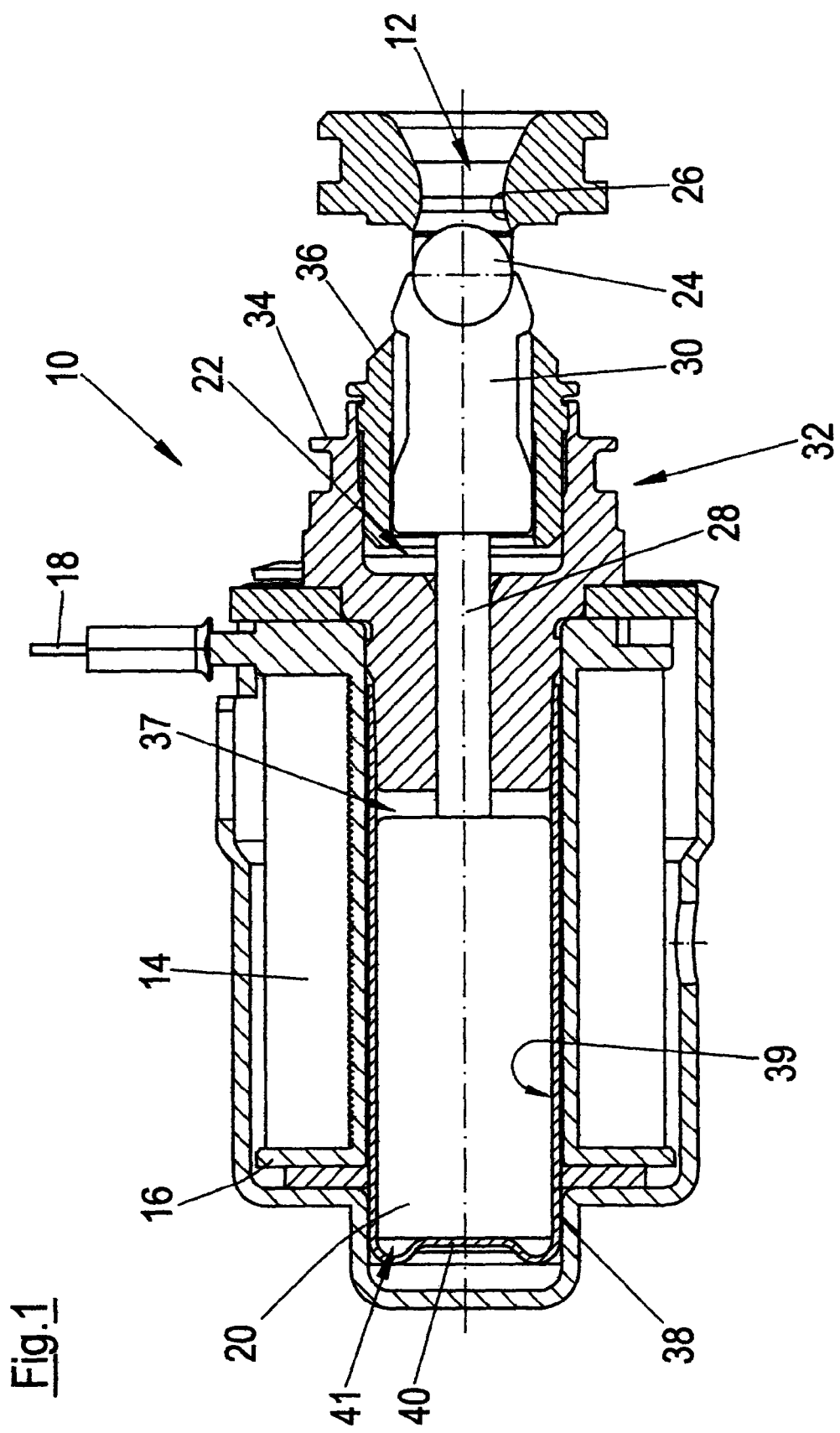
FIG. 1 shows an embodiment of the solenoid valve according to the invention.

FIG. 1 shows a solenoid valve 10 that controls the flow of hydraulic fluid of a hydraulic system through a flow aperture 12. The hydraulic system can, for example, be associated with a transfer case of a motor vehicle (not shown). Transfer cases of this kind are used to selectively distribute a drive torque to the axles of the vehicle. In such an application, the solenoid valve 10 can be used for example as a relief valve that is only activated—i.e., closed in the depicted embodiment—when both axles of the motor vehicle are to be supplied with drive torque. Otherwise, the valve 10 is not activated since the hydraulic system is not required to actuate a clutch of the transfer case.

In the depicted open state of the solenoid valve 10, the hydraulic fluid can flow from right to left through the flow aperture 12 and can be supplied, for example, to a sump (not shown). Further details of the hydraulic system are not shown since they are not of central significance to comprehension of the solenoid valve 10.

With an active distribution of the torque to the axles of the vehicle, the solenoid valve 10—as explained above—is closed, and the hydraulic system can be used in the desired fashion to control the transfer case and the clutch associated with it. In certain driving situations, however, it is necessary to quickly interrupt the distribution of torque, for example in the case of ABS/ESP interventions for controlling the handling of the vehicle. Assuring a rapid discharge of the hydraulic fluid through the solenoid valve 10 requires high actuation dynamics of the solenoid valve 10. The above-mentioned ABS/ESP interventions typically require times of at most 150 ms for the relief of the hydraulic pressure in the hydraulic system. Due to such steep requirements, the speed with which the solenoid valve 10 reacts to an electrical switching signal is also of crucial significance to the reaction time of the hydraulic system as a whole.

The solenoid valve 10 has a coil 14 that is wound onto a coil support 16 and is connected to a control unit, not shown, via a cable connection 18. The control unit can selectively supply current to the coil 14 in order to produce a magnetic field that acts on an armature 20. The armature 20 is situated at least partially inside the coil 14. It is at least partially composed of magnetic material.

When the coil 14 produces a magnetic field, this cooperates with the magnetization of the armature 20 and pushes the armature 20 toward the right. As a result, a valve element 22 connected to the armature 20 is also slid toward the right. The valve element 22 has a ball element 24 that the movement of the valve element 22 pushes into a correspondingly shaped valve seat 26 of the flow aperture 12 in order to close the flow aperture 12. The valve element 22, which is essentially composed of a rod 28 and a valve component 30 including the ball element 24, is supported by means of a valve element seat 32 composed of two parts. A first component 34 of the valve element seat 32 oriented toward the armature 20 is provided to guide the rod 28 while a second component 36 of the valve element seat 32 oriented toward the flow aperture 12 is provided to guide the valve component 30.

The components of the valve element seat 32 and the corresponding components of the valve element 22 do not produce a hydraulic fluid-tight connection, and as a result, hydraulic fluid is able to penetrate from the flow aperture 12, between the valve element 22 and the valve element seat 32, to the armature 20.

The armature 20 is situated in a valve chamber 37 that is encompassed by a sleeve 38, which is in turn connected in a fluid-tight fashion to the first component 34 of the valve element seat 32 oriented toward the armature 20. In a form that is not shown, the valve element seat 32 is connected to the hydraulic system in a fluid-tight fashion so that the hydraulic system is intrinsically closed. Between the sleeve 38 and the armature 20, a thin annular chamber 39 is provided. This permits the hydraulic fluid to flow from one end of the armature 20 to the other. The armature 20 is therefore surrounded by hydraulic fluid ("floating armature").

There is only a slight distance between the coil 14 and the armature 20. On the one hand, this achieves a compact design, and, on the other hand, this permits the coil 14 to be of small dimensions since it is only necessary to produce weak magnetic fields in order to move the armature 20. Due to the fact that the armature 20 "floats" in the fluid, it is simultaneously lubricated, i.e. the mechanical friction between the sleeve 38 and the armature 20 is minimized.

Because of the only very thin embodiment of the annular chamber 39 between the armature 20 and the sleeve 38, hydraulic fluid can only be transported from one end of the armature 20 to the other with difficulty. This impedes the movement of the armature 20 since it must displace hydraulic fluid when executing a switching motion.

For example, if one starts from a closed valve position (FIG. 1 shows an open valve position), then when the current supply to the coil 14 is interrupted, the hydraulic pressure acting on the valve element 22 pushes the armature 20 toward the left. In this case, the fluid situated in a chamber 41 between the armature 20 and an end wall 40 of the sleeve 38 must be transported toward the right past the armature 20. Due to the relatively small cross-section of the annular chamber 39, the flow resistance of the fluid slows the motion of the armature 20, thus negatively affecting the actuation dynamics of the solenoid valve 10. The above-mentioned problem occurs particularly when the hydraulic fluid is cold and therefore has a high viscosity.

Figure 2A:
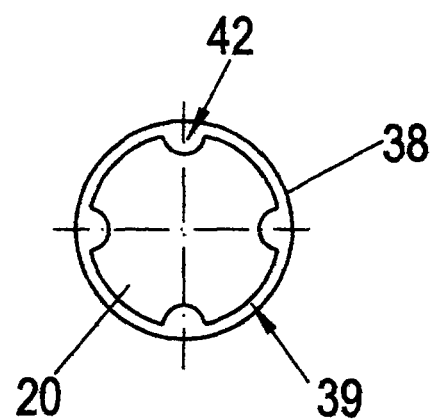
FIGS. 2a and 2b show different embodiments of a cross-section through an armature of the solenoid valve.

One attainment of the object lies in providing recesses on the armature 20 along which the hydraulic fluid can flow. Recesses of this kind are shown in FIG. 2*a* (grooves 42) and 2*b* (flattened regions 44) as examples of different armature and housing cross-sections (round and square). It should be noted in this connection that different types of recesses can be combined. In addition, the number and cross-sections of the recesses can be freely selected. The embodiments above also apply analogously to recesses that can be provided in components of the valve element 22 in order to facilitate the flow of hydraulic fluid. It should also be noted that alternative or additional corresponding recesses can also be provided in the sleeve 38 and the components of the valve element seat 32.

Through the removal of material, however, the provision of recesses reduces the magnetic moment of the armature 20, thus reducing the maximum force that the solenoid valve 10 can produce for closing the flow aperture 12 and requiring a higher switching voltage in order to maintain the closing force. In other words, recesses that are large enough to assure satisfactory dynamic properties of the solenoid valve 10 even in "cold" operating states of the hydraulic system result in a reduction in the maximum holding force of the solenoid valve 10 at a predetermined switching voltage.

Figure 2B:
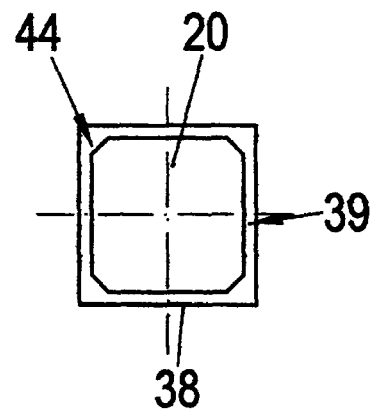

The solenoid valve 10 therefore does have recesses of the kind shown by way of example in FIGS. 2*a* and 2*b*, but these are kept relatively small.

In order to achieve high actuation dynamics of the solenoid valve 10 without excessively reducing its maximum holding force, the coil 14 is situated so that it contributes in a suitable fashion to the heating of the hydraulic fluid at least in the vicinity of the armature 20. In addition, a heating of the hydraulic fluid is also achieved in the vicinity of the valve element seat 32. To this end, the coil 14 is situated on the one hand in spatial proximity to the above-mentioned components, and, on the other hand, it has turned out to be advantageous if the above-mentioned components have a relatively high thermal conductivity. As a result, the heat produced by the ohmic resistance of the coil 14 when it is supplied with current can be transmitted to the sleeve 38 and the components of the valve element seat 32 in order to heat the hydraulic fluid and thus reduce its viscosity.

To make the heating of the hydraulic fluid more efficient and to always assure high actuation dynamics of the solenoid valve 10, the coil 14 is supplied with current even when this is not actually required from a drive dynamics standpoint so as to keep the hydraulic system pressurized and to close the flow aperture 12. In this connection, the current supply to the coil 14 can be selected to be powerful enough that the flow aperture 12 is closed—although this is not actually required for the control of the transfer case—if the closing of the flow aperture 12 does not negatively affect the function of the transfer case. But if the flow aperture 12 must be open, then the coil 14 can nevertheless be supplied with a current that is lower than a limit current supply required to activate the solenoid valve 10. This ensures that on the one hand, the magnetic field produced by the coil 14 is not sufficient to move the armature 20, but, on the other hand, at least a slight heating of the hydraulic fluid occurs.

Alternatively or in addition, it is possible to provide a current supply to the coil 14 that is more powerful than the minimum current supply required to close the flow aperture 12. The valve element 22 is then pressed against the valve seat 26 more powerfully than is required by the hydraulic pressure in the hydraulic system. The "excess" current supply is used in the above-described fashion to heat the hydraulic fluid in the vicinity of the solenoid valve 10.

Figure 3A:
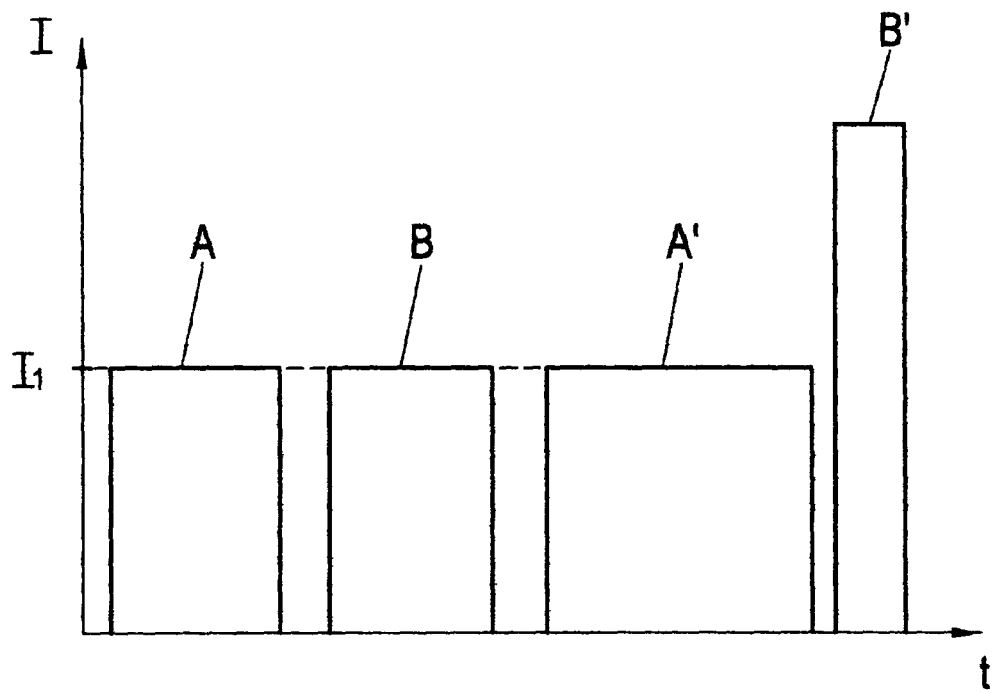
FIGS. 3a and 3b show a phase pattern of the coil of the solenoid valve according to different embodiments of the method according to the invention.
Figure 3B:
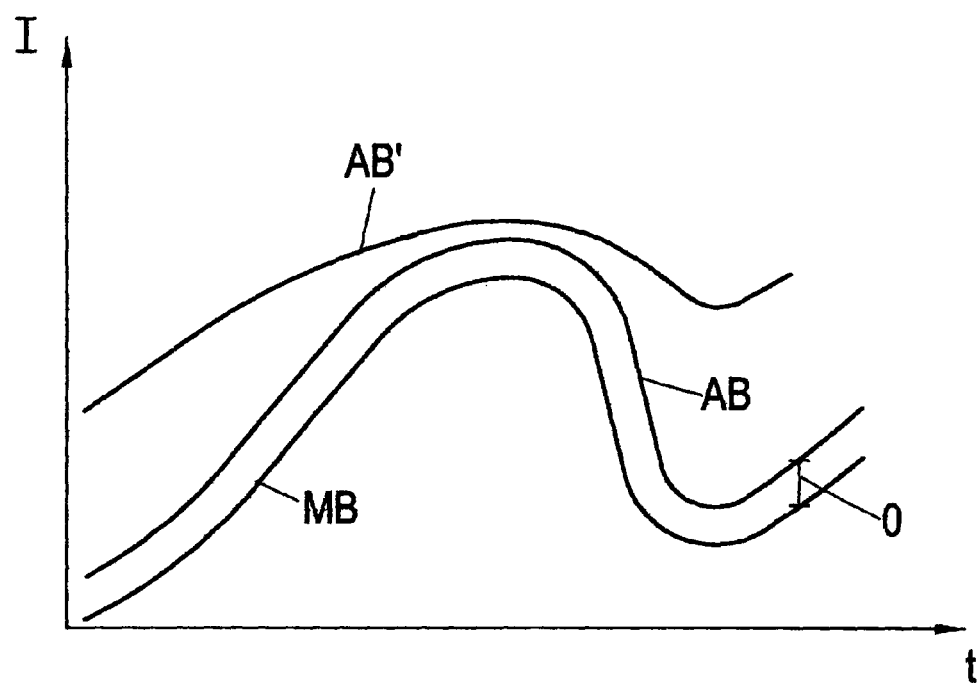

In conjunction with examples of current/time graphs (I(t) graphs), FIGS. 3*a* and 3*b* show different variants for how the coil 14 can be supplied with current in order to heat the hydraulic fluid.

The intervals A and A' in FIG. 3*a* symbolize time intervals during which the solenoid valve 10 receives a control signal instructing it to close the flow aperture 12 in order to permit a control of the transfer case. To this end, the coil 14 is acted on with the amperage I1. The interval B represents an additional current supply to the coil 14 with the amperage I1 that is carried out by the control unit in order to heat the hydraulic fluid. The time interval B' represents another type of current supply that is more powerful than the current supply in the intervals A, A', B, but by contrast occurs for a shorter time. Naturally, the amperage I1 does not have to be a constant value but can itself be a function of time t, particularly if the current supply of the coil 14 depends on the hydraulic pressure in the hydraulic system (e.g., minimum current supply).

It is possible to carry out such "heating pulses" at regular intervals. Alternatively or in addition, other data can also be incorporated in order to trigger a "heating current supply" to the coil 14. For example, such data can be temperature values provided by hydraulic fluid temperature sensors, outside temperature sensors or similar sensors. In addition, an opening of a vehicle door, an ignition-ON signal, or an engine-ON signal can also trigger a request for a "heating current supply." The above-mentioned signals and/or other signals can be combined in a suitable fashion in order to keep the actuation dynamics of the solenoid valve within a desired range.

FIG. 3b shows an example of how the current supply can be varied as a function of the pressure prevailing in the hydraulic system in order to also produce a heating of the hydraulic fluid in the vicinity of the solenoid valve 10. The graph depicts a minimum current supply MB that indicates the minimum amperage I required to close or open the solenoid valve 10 in opposition to the hydraulic pressure. The curve AB indicates a working current supply that is greater than the minimum current supply MB by a constant offset value O in order to produce a more powerful heating of the hydraulic fluid than would be possible solely by means of the "normal" operation of the solenoid valve 10. A nonlinear relationship between the working current supply and the minimum current supply MB is depicted by the curve AB'. The difference between the working current supply AB' and the minimum current supply MB is greater for low values of the minimum current supply MB than for high values of the minimum current supply.

The working current supplies AB, AB' of FIG. 3b are merely examples of functional dependencies between the minimum current supply and the working current supply AB. The functional relationship between the curves MB, AB and MB, AB', respectively, can be freely selected in order to conform with the respective requirements.

Naturally, the current supply concepts described in conjunction with FIGS. 3a and 3b can be combined in any desired fashion.

REFERENCE NUMERAL LIST 10 solenoid valve
12 flow aperture
14 coil
16 coil support
18 cable connection
20 armature
22 valve element
24 ball element
26 valve seat
28 rod
30 valve component
32 valve element seat
34 component oriented toward armature
36 component oriented toward flow aperture
37 valve chamber
38 sleeve
39 annular chamber
40 end wall
41 chamber
42 groove
44 flattened region
I, I1 current
t time
A, A', B, B' interval
MB minimum current supply
AB, AB' working current supply
O offset

The invention claimed is:

1. A solenoid valve for controlling flow of hydraulic fluid in a hydraulic system, comprising:
    a coil of electrically conductive material wound on a coil support, the coil support having an inner surface defining an internal chamber;
    a cup-shaped tubular sleeve disposed in the internal chamber and having an outer surface located in close spatial proximity to the inner surface of the coil support;
    a valve element seat disposed in the internal chamber of the coil support and secured in a fluid-tight manner to an open end of the tubular sleeve so as to define a valve chamber therebetween, the valve chamber communicating with hydraulic fluid from the hydraulic system;
    an armature supported for sliding movement within the valve chamber and defining an annular chamber between its outer surface and the inner surface of the tubular sleeve such that the armature floats in the hydraulic fluid within the annular chamber;
    a valve element extending through a bore in the valve element seat into the valve chamber and engaging a first end of the armature for movement in response to movement of the armature, wherein the valve element is spaced from a valve seat when the solenoid valve is not activated and is received in the valve seat when the solenoid valve is activated, and a control unit for activating the solenoid valve by supplying a current to the coil that is greater than a minimum current required to move the armature against hydraulic pressure in the valve chamber and push the valve element into the valve seat and to heat the hydraulic fluid within the annular chamber, and
    wherein the control unit supplies a current to the coil that is lower than a minimum current required to move the armature against the hydraulic pressure in the valve chamber to keep the valve element spaced from the valve seat and heat the hydraulic fluid within the annular chamber whenever the solenoid valve is not activated.

2. The solenoid valve of claim 1, wherein the heat is transmitted directly through the tubular sleeve and is produced by ohmic resistance of the coil generated in response to the current supplied to the coil by the control unit.

3. The solenoid valve of claim 2 wherein the tubular sleeve is disposed adjacent the coil support and is made from high thermally conductive materials.

4. The solenoid valve of claim 3 wherein recesses are provided in at least one of the valve element and the bore in the valve element seat to facilitate the flow of hydraulic fluid between the hydraulic system and the valve chamber.

5. The solenoid valve of claim 1 wherein the tubular sleeve includes an end wall opposite its open end and which defines an end chamber in conjunction with a second end of the armature, and wherein the end chamber is in fluid communication with the annular chamber surrounding the armature.

6. The solenoid valve of claim 5 wherein recesses are provided in the outer surface of the armature in order to facilitate the flow of the hydraulic fluid between the end chamber and the annular chamber.

7. The solenoid valve of claim 1 wherein the solenoid valve is situated in or on a transfer case or an all-wheel clutch of a motor vehicle.

8. The solenoid valve of claim 1 wherein the control unit is operable to provide the current supply to the coil based on sensor signals indicative of at least one of a hydraulic fluid temperature, an ambient air temperature and ignition of the motor vehicle.

9. A method for controlling a solenoid valve in a hydraulic system, comprising:
providing the solenoid valve having a coil of electrically conductive material wound on a coil support and defining an internal chamber, a tubular sleeve disposed within the internal chamber in close proximity to the coil, a valve element seat disposed within the internal chamber and secured in a fluid-tight manner to an open end of the tubular sleeve so as to define a valve chamber therebetween in communication with the hydraulic system and which is filled with hydraulic fluid, and an armature supported for sliding movement within the valve chamber and defining an annular chamber with the tubular sleeve, wherein the valve element is spaced from a valve seat when the solenoid valve is not activated and is received in the valve seat when the solenoid valve is activated;
activating the solenoid valve by supplying a current to the coil that is greater than a minimum current required to move the armature against hydraulic pressure in the valve chamber and push the valve element into the valve seat to generate heat in the electrically conductive material of the coil and conduct heat directly through the coil support and to the tubular sleeve to reduce the viscosity of the hydraulic fluid within the annular chamber between the armature and the tubular sleeve; and
supplying a current to the coil that is lower than a minimum current required to move the armature against hydraulic pressure in the valve chamber to keep the valve element spaced from the valve seat and heat the hydraulic fluid within the annular chamber whenever the solenoid valve is not activated.

10. The method of claim 9 further comprising providing a control unit for activating the solenoid valve by supplying the current to the coil for causing the armature to move within the valve chamber, and wherein the control unit is further operable to periodically supply the current to the coil to generate the heat that is transferred to the hydraulic fluid.

11. The method of claim 10 further comprising producing the heat that is transferred directly through the coil support and the tubular sleeve to the hydraulic fluid by ohmic resistance of the coil that is generated by the current supplied to the coil by the control unit.

12. The method of claim 9 including transferring heat from the coil directly through the coil support and the tubular sleeve to the hydraulic fluid in the annular chamber to reduce its viscosity.

13. The method of claim 9 wherein the current supplied to the coil during the activating step is at a predetermined electrical power value.

14. The method of claim 9 wherein the current supplied to the coil during the activating step is a function of the minimum current required to move the armature against hydraulic pressure.

15. The method of claim 9 wherein the current supplied to the coil during the activating step is provided at predetermined times.

16. The method of claim 9 wherein the current supplied to the coil during the activating step is based on signals detecting a temperature of the hydraulic fluid.

17. A solenoid valve for controlling flow of hydraulic fluid in a hydraulic system, comprising:
a coil support having an inner surface extending from a first end to a second end and defining an internal chamber;
a coil of electrically conductive material wound on said coil support,
a cup-shaped tubular sleeve disposed in said internal chamber of said coil support and containing hydraulic fluid, said tubular sleeve having an outer surface adjacent said inner surface of said coil support, said outer surface extending from an end wall disposed outwardly of said second end of said coil support to an open end disposed inwardly of said first end of said coil support, and said tubular sleeve being made from a high thermally conductive material;
an armature formed of a magnetic material encompassed by said tubular sleeve and floating in the hydraulic fluid, said armature having an outer surface facing and spaced from said tubular sleeve to present a thin annular chamber surrounding said outer surface of said armature and containing the hydraulic fluid, said outer surface of said armature including a plurality of recesses facing said tubular sleeve along which the hydraulic fluid can flow, said armature extending from a second end facing said end wall of said tubular sleeve to a first end facing said open end of said tubular sleeve, said second end of said armature and said end wall of said tubular sleeve presenting an end chamber therebetween for containing the hydraulic fluid, said end chamber being in fluid communication with said thin annular chamber surrounding said outer surface of said armature, and wherein said armature moves toward said open end of said tubular sleeve when said solenoid valve is activated;
a valve element including a rod attached to said first end of said armature and extending outwardly of said internal chamber presented by said coil support, said valve element including a ball element attached to said rod and a valve component surrounding half of said ball element and coupling said ball element to said rod, wherein said rod and said ball element and said valve component move in response to movement of said armature;
a valve seat element disposed partially in said internal chamber of said coil support and including a first component guiding said rod and being in fluid-tight engagement with said tubular sleeve, said first component having an inner end facing said armature such that said first component and said armature and said tubular sleeve present a valve chamber containing the hydraulic fluid therebetween, said first component having an outer end presenting an opening facing outwardly of said internal chamber, and said valve seat element including a second component received in said opening of said first component and guiding said valve component;
a valve seat spaced from said ball element when the solenoid valve is not activated and receiving said ball element when the solenoid valve is activated, and
a control unit connected to said coil via a cable connection, said control unit activating the solenoid valve by supplying a current to said coil that is greater than a minimum current required to move said armature against hydraulic pressure in said valve chamber and push said ball element into said valve seat and to heat the hydraulic fluid within said thin annular chamber, and wherein said control unit supplies a current to said coil that is lower than a minimum current required to move said armature against the hydraulic pressure in said valve chamber to keep said ball element spaced from said valve seat and heat the hydraulic fluid within said thin annular chamber whenever the solenoid valve is not activated.

* * * * *